(12) United States Patent
Higuchi et al.

(10) Patent No.: US 7,639,290 B2
(45) Date of Patent: Dec. 29, 2009

(54) DATA READ CIRCUIT OF SOLID-STATE IMAGING DEVICE, IMAGING APPARATUS, AND DATA READ METHOD FOR SOLID-STATE IMAGING DEVICE

(75) Inventors: Tsuyoshi Higuchi, Kawasaki (JP); Jun Funakoshi, Kawasaki (JP); Seiji Yamagata, Kawasaki (JP); Toshitaka Mizuguchi, Kawasaki (JP); Katsuyoshi Yamamoto, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 826 days.

(21) Appl. No.: 11/138,483

(22) Filed: May 27, 2005

(65) Prior Publication Data

US 2006/0170795 A1 Aug. 3, 2006

(30) Foreign Application Priority Data

Feb. 3, 2005 (JP) ............................. 2005-027772

(51) Int. Cl.
*H04N 9/64* (2006.01)
(52) U.S. Cl. .................................................... 348/243
(58) Field of Classification Search ................. 348/241, 348/243, 302, 308
See application file for complete search history.

(56) References Cited

U.S. PATENT DOCUMENTS

| | | | | |
|---|---|---|---|---|
| 4,589,025 | A * | 5/1986 | Monahan et al. ............ | 348/243 |
| 6,433,822 | B1 * | 8/2002 | Clark et al. .................. | 348/241 |
| 6,965,407 | B2 * | 11/2005 | Boemler et al. ............. | 348/302 |
| 7,280,140 | B2 * | 10/2007 | Henderson ................... | 348/241 |
| 7,345,613 | B2 * | 3/2008 | Higuchi ....................... | 341/155 |
| 2003/0193595 | A1 * | 10/2003 | Henderson ................... | 348/308 |
| 2003/0227040 | A1 * | 12/2003 | Henderson ................... | 257/291 |

FOREIGN PATENT DOCUMENTS

| | | |
|---|---|---|
| JP | 2002-027331 | 1/2002 |
| JP | 2002-218324 | 8/2002 |
| JP | 2002-232787 | 8/2002 |

\* cited by examiner

*Primary Examiner*—Jason Chan
*Assistant Examiner*—Nicholas G Giles
(74) *Attorney, Agent, or Firm*—Arent Fox LLP

(57) ABSTRACT

A differential amplifier has a first input terminal to which a voltage of a noise signal of the solid-state imaging device is supplied and a second input terminal to which a voltage of a temporary data signal having the noise signal of the solid-state imaging device superposed thereon is supplied. The differential amplifier inverts an output signal when a magnitude relationship in voltage between the first and second input terminals becomes reverse. A measurement circuit measures a variation amount of a voltage of the second input terminal from when the voltage of the second input terminal begins to vary in a direction to reverse the magnitude relationship to when the output signal of the differential amplifier is inverted, and outputs a measurement result as a digital value indicating a voltage of a real data signal obtained by removing the noise signal from the temporary data signal.

14 Claims, 10 Drawing Sheets

DATA READ CIRCUIT OF SOLID-STATE IMAGING DEVICE, IMAGING APPARATUS, AND DATA READ METHOD FOR SOLID-STATE IMAGING DEVICE

CROSS REFERENCE TO RELATED APPLICATION

This application is based upon and claims the benefit of priority from Japanese Patent Application No. 2005-027772, filed on Feb. 3, 2005, the entire contents of which are incorporated herein by reference.

BACKGROUND OF THE INVENTION

1. Field of the Invention

The present invention relates to a technique for reducing a scale of a data read circuit of a solid-state imaging device and current consumption of the data read circuit.

2. Description of the Related Art

In general, an imaging apparatus has a data read circuit provided in each column of a pixel array. The data read circuit reads a noise signal and a data signal with the noise signal superposed thereon from a pixel circuit, generates a signal (an actual data signal) from which a common mode noise is removed by a CDS (Correlated Double Sampling) circuit, and converts the generated signal, which is an analog signal, into a digital signal using an ADC (Analog to Digital (A/D) Conversion) circuit contained in the data read circuit.

In addition, Japanese Unexamined Patent Application Publication No. 2002-218324 discloses a data read circuit including a chopper type voltage comparator, a first switch connecting an input node of the chopper type voltage comparator to an output node of a pixel circuit, and a capacitor provided between the input node of the chopper type voltage comparator and an output node of a ramp signal generating circuit, for the purpose of reduction of the scale and current consumption of the data read circuit.

The data read circuit having the CDS circuit and the ADC circuit provided separately is enlarged in its scale as the number of amplifiers increases. As a result, the production costs of the data read circuit are raised. In addition, the increase of the number of the amplifiers causes the increase of the current consumption and the deterioration of data read accuracy. Moreover, since the data read circuit disclosed in Japanese Unexamined Patent Application Publication No. 2002-218324 uses the chopper type voltage comparator in which a signal is transmitted from its input side to its output side via the capacitor, it may take a long time to perform a data read operation. Therefore, such a data read circuit cannot be employed for an imaging apparatus having a number of pixels because the imaging apparatus requires a high-speed data read operation.

SUMMARY OF THE INVENTION

Accordingly, it is an object of the present invention to reduce a scale of a data read circuit of a solid-state imaging device and hence to reduce the production costs thereof without lowering a data read speed of the data read circuit. It is another object of the present invention to reduce current consumption of the data read circuit of the solid-state imaging device.

According to an aspect of the present invention, a solid-state imaging device of an imaging apparatus outputs a noise signal and a temporary data signal with the noise signal superposed thereon. A data read circuit of the imaging apparatus outputs a digital value indicating a voltage of a real data signal obtained by removing the noise signal from the temporary data signal, based on a voltage of the noise signal and a voltage of the temporary data signal. The data read circuit includes a differential amplifier and a measurement circuit. The differential amplifier has a first input terminal to which the voltage of the noise signal is supplied and a second input terminal to which the voltage of the temporary data signal is supplied. The differential amplifier inverts an output signal in response to occurrence of an event that a magnitude relationship in voltage between the first and second input terminals becomes reverse. The measurement circuit measures an amount of variation of a voltage of one of the first and second input terminals of the differential amplifier from when the voltage of the one of the input terminals begins to vary in a direction to reverse the magnitude relationship in voltage to when the output signal of the differential amplifier is inverted, and outputs a result of the measurement as a digital value.

The data read circuit as configured above can implement functions (noise removal and A/D conversion) of both of the CDS circuit and the ADC circuit using the differential amplifier and the measurement circuit without requiring a separate CDS circuit for removing the noise signal. Like this, since the separate CDS circuit is not required, the scale and production costs of the data read circuit can be reduced. In addition, since the number of amplifiers can be further reduced as compared to when the CDS circuit and the ADC circuit are separately required, the current consumption of the data read circuit can be reduced and the data read accuracy can be improved. Furthermore, since the signals from the solid-state imaging device are transferred without passing through a capacitor, the data read speed can be prevented from being lowered. Particularly, a remarkable effect can be attained when the present invention is applied to an imaging apparatus having a large number of pixels.

According to a preferable example of the aspect of the present invention, when one of the input terminals is the second input terminal (i.e., the voltage of the second input terminal varies from the voltage of the temporary data signal), a ramp signal generating circuit generates a ramp signal of which a voltage is increased with a predetermined gradient when the voltage of the temporary data signal is lower than the voltage of the noise signal. A capacitor element has one end connected to the second input terminal and the other end to receiving the ramp signal. That is, the voltage of the second input terminal is increased using the capacitive coupling of the capacitor element. This allows the voltage of the second input terminal to be varied (increased) by a simple circuit configuration.

According to a preferable example of the aspect of the present invention, when one of the input terminals is the first input terminal (i.e., the voltage of the first input terminal varies from the voltage of the noise signal), a ramp signal generating circuit generates a ramp signal of which a voltage is decreased with a predetermined gradient when the voltage of the temporary data signal is lower than the voltage of the noise signal. A capacitor element has one end connected to the first input terminal and the other end to receiving the ramp signal. That is, the voltage of the first input terminal is decreased using the capacitive coupling of the capacitor element. This allows the voltage of the first input terminal to be varied (decreased) by a simple circuit configuration.

According to a preferable example of the aspect of the present invention, when one of the input terminals is the second input terminal, a ramp signal generating circuit generates a ramp signal of which a voltage is decreased with a predetermined gradient when the voltage of the temporary data signal is higher than the voltage of the noise signal. A capacitor element has one end connected to the second input terminal and the other end to receiving the ramp signal. That is, the voltage of the second input terminal is decreased using the capacitive coupling of the capacitor element. This allows the voltage of the second input terminal to be varied (decreased) by a simple circuit configuration.

According to a preferable example of the aspect of the present invention, when one of the input terminals is the first input terminal, a ramp signal generating circuit generates a ramp signal of which a voltage is increased with a predetermined gradient when the voltage of the temporary data signal is higher than the voltage of the noise signal. A capacitor element has one end connected to the first input terminal and the other end to receiving the ramp signal. That is, the voltage of the first input terminal is increased using the capacitive coupling of the capacitor element. This allows the voltage of the first input terminal to be varied (increased) by a simple circuit configuration.

According to a preferable example of the aspect of the present invention, one of the input terminals is the second input terminal to which the voltage of the temporary data signal is supplied. The first and second input terminals are an inverting input terminal and a non-inverting input terminal, respectively. That is, an input terminal having a voltage varied in the direction to reverse the magnitude relationship in voltage between the first and second input terminals of the differential amplifier is the non-inverting input terminal to which the voltage of the temporary data signal is supplied. Accordingly, the voltage of the non-inverting input terminal is varied from the voltage of the temporary data signal, and the voltage of the inverting input voltage remains at that of the noise signal and is unchanged. For a plurality of solid-state imaging devices having the same configuration, noise signals outputted from the solid-state imaging devices have substantially the same voltage. However, temporary data signals outputted from the solid-state imaging devices are varied depending on the amount of exposure of the solid-state imaging device. Accordingly, the voltage of the inverting input terminal of the differential amplifier can be always maintained at a nearly constant level, which results in further improving the data read accuracy.

According to a preferable example of the aspect of the present invention, a counter of the measurement circuit initiates a count operation when the voltage of the ramp signal begins to vary. A measurement result output circuit of the measurement circuit acquires a counter value of the counter in response to the inversion of the output signal of the differential amplifier and outputs the acquired counter value as a digital value. Accordingly, a measurement circuit for measuring the amount of variation of the voltage of one of the input terminals to output a result of the measurement as the digital value can be easily configured.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
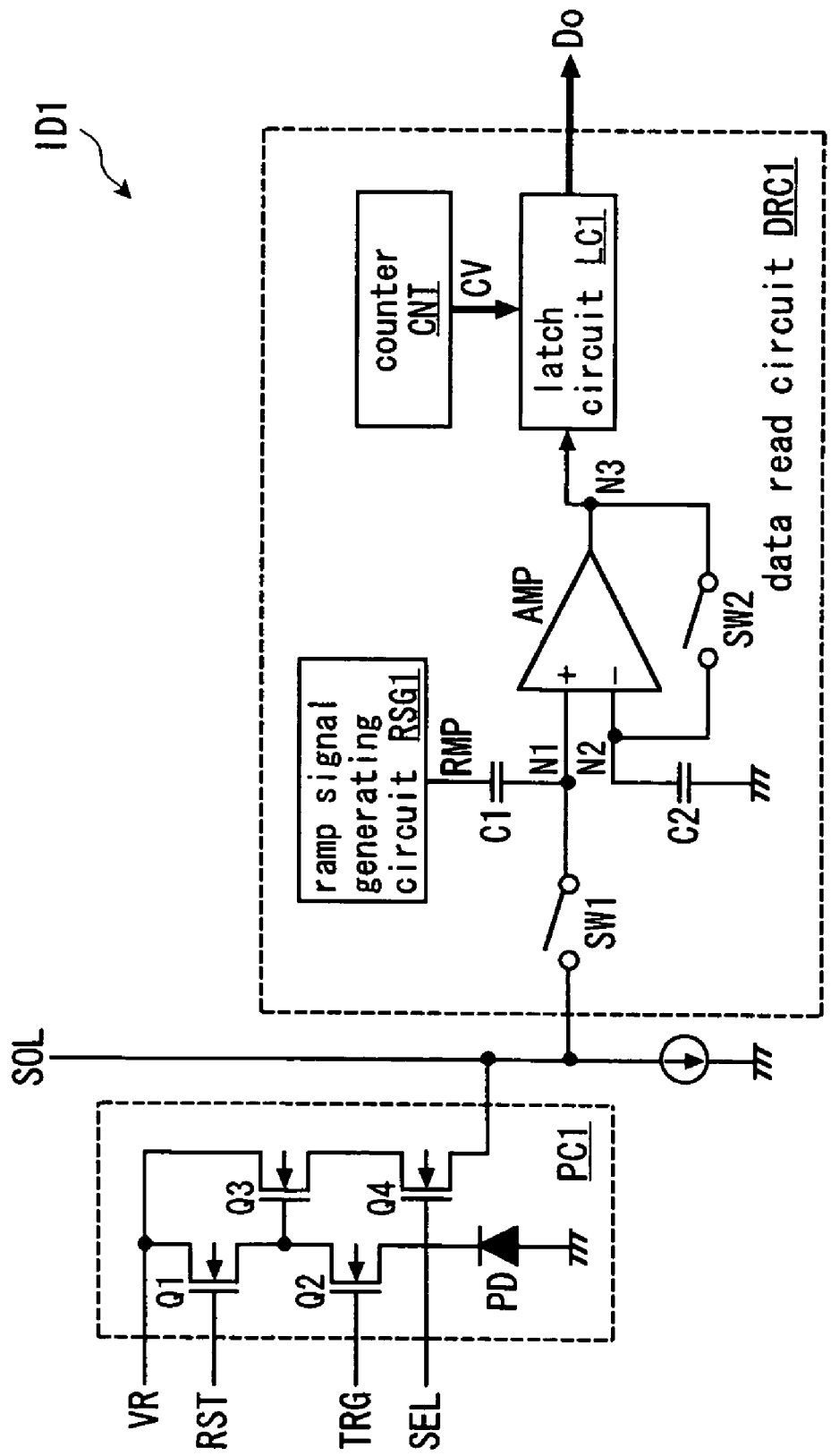
FIG. 1 is a block diagram of a first embodiment of the present invention.

Hereinafter, exemplary embodiments of the present invention will be described with reference to the accompanying drawings. Signals depicted by a thick line refer to a plurality of signals. FIG. 1 shows a first embodiment of the present invention. An imaging apparatus ID1 of the first embodiment includes, for example, a data read circuit DRC1 having a plurality of pixel circuits PC1 provided for each of signal output lines SOL (columns) of pixel arrays arranged in a matrix.

Each pixel circuit PC1 (solid-state imaging device), which is a well-known four-transistor pixel circuit, has nMOS transistors Q1 to Q4 and a photodiode PD. The transistors Q1 and Q2 are connected in series between a reset voltage supply line VR and a cathode of the photodiode PD. A gate electrode of the transistor Q1 receives a reset signal RST. A gate electrode of the transistor Q2 receives a trigger signal TRG. An anode of the photodiode PD is connected to a ground line. The transistors Q3 and Q4 are connected in series between the reset voltage supply line VR and the signal output line SOL. A gate electrode of the transistor Q3 is connected to a connection node between the transistors Q1 and Q2. A gate electrode of the transistor Q4 receives a select signal SEL. The four-transistor pixel circuit PC1 as configured above has an advantage in that data read accuracy is improved even though its scale is enlarged due to a large number of transistors.

The data read circuit DRC1 includes a differential amplifier AMP, switches SW1 and SW2, capacitors C1 and C2, a ramp signal generating circuit RSG1, a counter CNT, and a latch circuit LC1 (measurement circuit). An inverting input terminal (first input terminal) of the differential amplifier AMP is connected to one end of the switch SW2 whose other end is connected to an output terminal of the differential amplifier AMP. The inverting input terminal of the differential amplifier AMP is also connected to one end of the capacitor C2 whose other end is connected to the ground line. A non-inverting input terminal (second input terminal) of the differential amplifier AMP is connected to one end of the switch SW1 whose other end is connected to the signal output line SOL. The non-inverting input terminal of the differential amplifier AMP is also connected to one end of the capacitor C1 whose other end receives a ramp signal RMP.

The ramp signal generating circuit RSG1 raises a voltage of the ramp signal RMP with a predetermined gradient when an A/D conversion in the data read operation is initiated. The counter CNT initiates an up-count and outputs a counter value CV to the latch circuit LC1 when the A/D conversion is initiated. The latch circuit LC1 (measurement result output circuit) latches the counter value CV in response to a rising edge of an output signal of the differential amplifier AMP and outputs the latched counter value CV as a digital value Do of a result of the A/D conversion.

Figure 2:
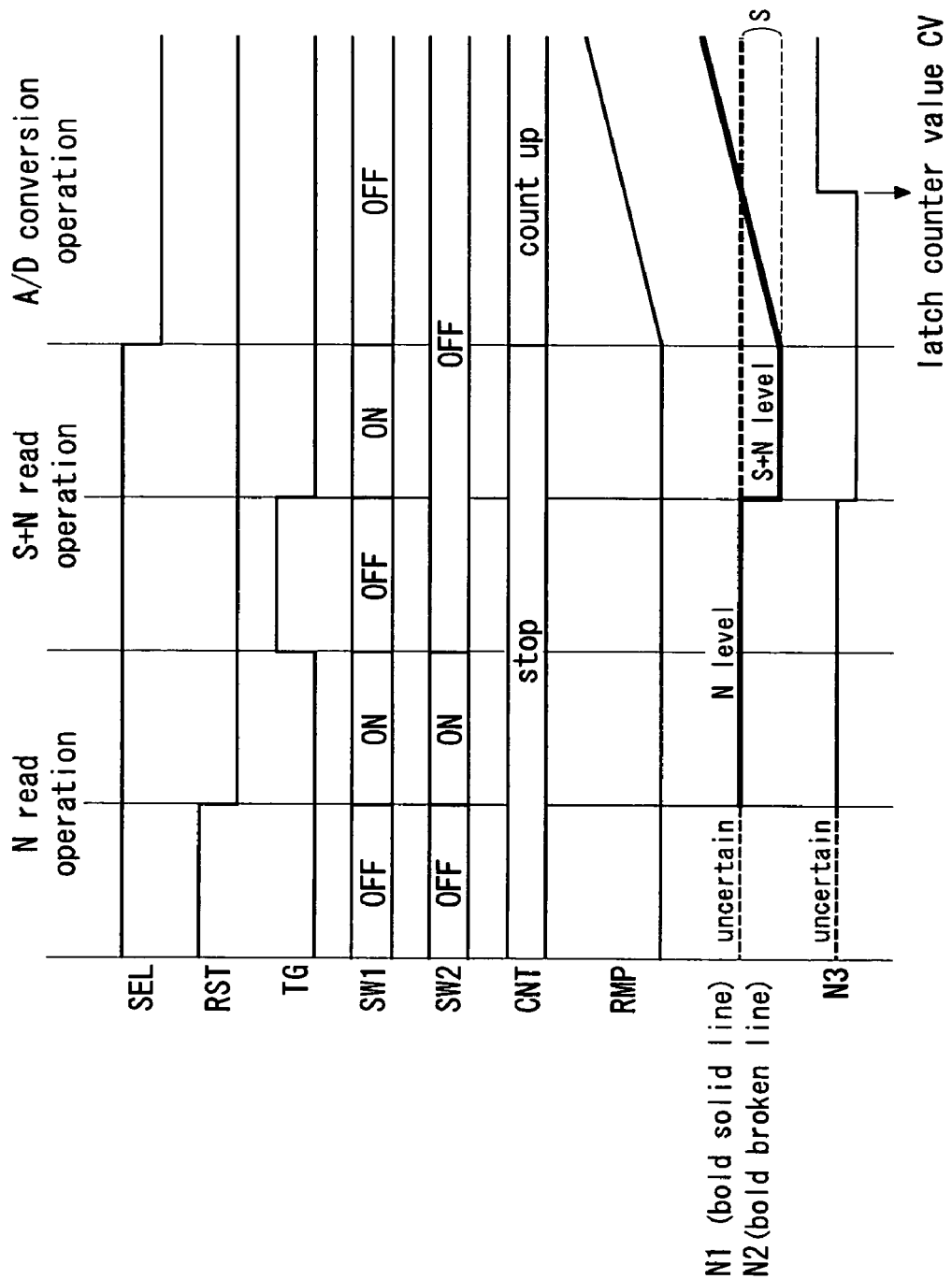
FIG. 2 is a timing chart illustrating a data read operation in the first embodiment.

FIG. 2 shows the data read operation in the first embodiment. The data read operation in the first embodiment includes an N read operation for reading a noise signal from the pixel circuit PC1, a S+N read operation for reading a temporary data signal, which is a signal obtained by superposing the noise signal on a real data signal, from the pixel circuit PC1, and the A/D conversion operation, which are sequentially performed.

First, in the N read operation, the transistor Q4 is turned on when the select signal SEL for selecting the pixel circuit PC1 as an object of the data read operation is activated. Simultaneously, the transistor Q1 is turned on when the reset signal RST is activated. Since the transistor Q3 is turned on depending on a voltage (corresponding to a reset voltage) of a connection node between the transistors Q1 and Q2, the signal output line SOL is set to a voltage (N level) of the noise signal (reset noise signal). In addition, when both of the switches SW1 and SW2 are turned on after the reset signal RST is deactivated, voltages of input nodes N1 and N2 of the differential amplifier AMP are set to the N level. In addition, since an offset potential between the inverting input terminal and the non-inverting input terminal of the differential amplifier AMP is included in a potential difference between both input terminals and is hold by the capacitor C2 when the switch SW2 is turned on, the offset potential is cancelled in a subsequent operation (offset cancel operation or Auto-Zero operation). In addition, the transistor Q1 is turned off when the reset signal RST is deactivated.

Next, in the S+N read operation, after both of the switches SW1 and SW2 are turned off, the transistor Q2 is turned on when the trigger signal TRG is activated. Since the transistor Q3 is turned on depending on a voltage (corresponding to the amount of exposure of the photodiode PD) of the connection node between the transistors Q1 and Q2, the signal output line SOL is set to a voltage (S+N level) of the temporary data signal. In addition, when the switch SW1 is turned on after the trigger signal TRG is deactivated, a voltage of the input node N1 of the differential amplifier AMP is set to the S+N level. At this time, since the switch SW2 remains off, a voltage of the input node N2 of the differential amplifier AMP remains at the N level. Accordingly, an output signal (signal from an output node N3) of the differential amplifier AMP is set to a low level indicating that the voltage of the input node N1 is lower than the voltage of the input node N2. In addition, the transistor Q2 is turned off when the trigger signal TRG is deactivated. In addition, a potential difference S between the voltage (S+N level) of the input node N1 and the voltage (N level) of the input node N2 of the differential amplifier AMP corresponds to a voltage of the real data signal.

Subsequently, in the A/D conversion operation, after the switch SW1 is turned off, the ramp signal generating circuit RSG1 begins to raise the voltage of the ramp signal RMP with the predetermined gradient. As the voltage is raised, the voltage of the input node N1 of the differential amplifier AMP also begins to rise from the S+N level with a predetermined gradient by a capacitive coupling of the capacitor C1. Simultaneously, the counter CNT initiates a count-up operation. In addition, when the voltage of the input node N1 of the differential amplifier AMP exceeds the voltage (N level) of the input node N2, that is, when a magnitude relationship between the voltage of the input node N1 and the voltage of the input node N2 of the differential amplifier AMP is changed, the output signal of the differential amplifier AMP is changed from a low level to a high level. The latch circuit LC1 latches the counter value CV in response to a rising edge of the output signal of the differential amplifier AMP and outputs the latched counter value CV as a digital value Do of a result of the A/D conversion.

The data read circuit DRC1 as configured above implements functionalities of both of the CDS circuit and the ADC circuit without requiring a separate CDS circuit. Like this, since the separate CDS circuit is not required, the scale and production costs of the data read circuit DRC1 can be reduced. In addition, since the number of amplifiers can be further reduced as compared to when the CDS circuit and the ADC circuit are separately required, the current consumption of the data read circuit DRC1 can be reduced.

Figure 3:
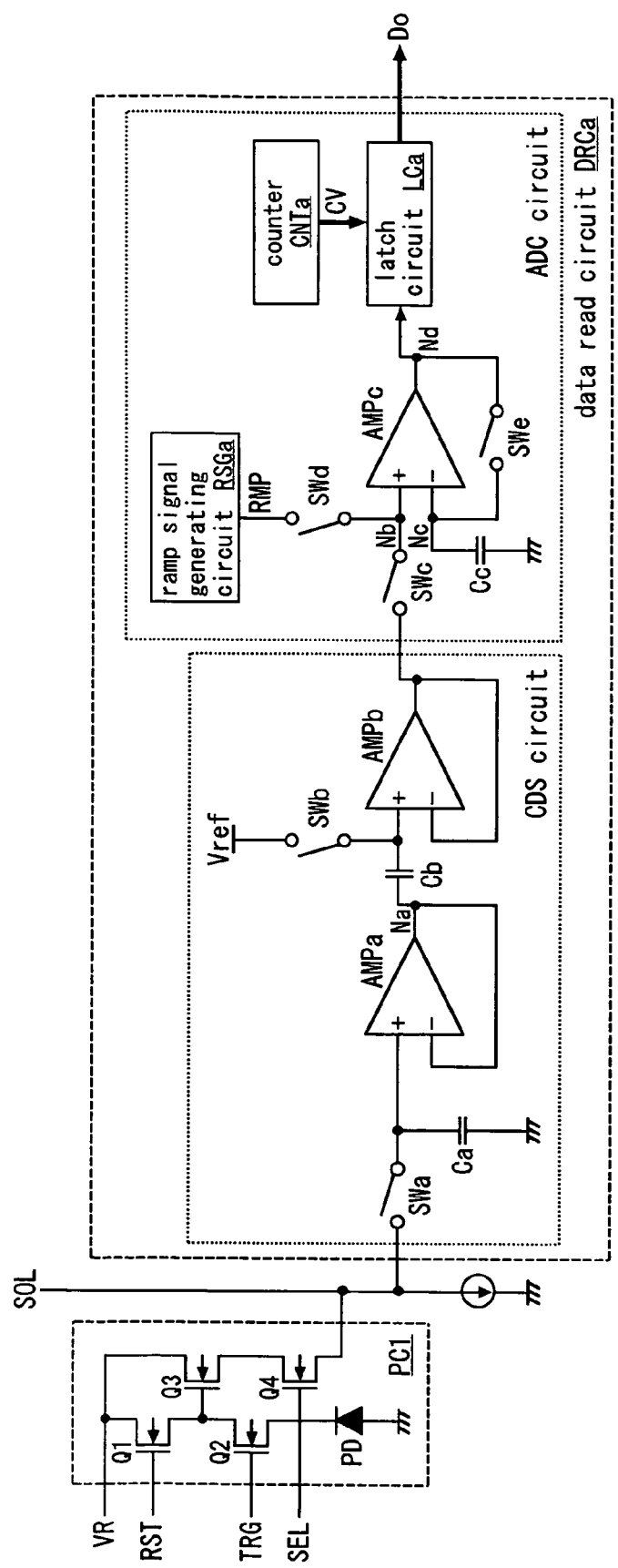
FIG. 3 is a block diagram illustrating a comparative example of the present invention.

FIG. 3 shows a comparative example of the present invention. In the following description of the comparative example of the present invention, the same elements as those shown in FIG. 1 are denoted by the same reference numerals, and detailed explanation thereof will be omitted. A data read circuit DRCa of the comparative example of the present invention includes a CDS circuit, which is composed of switches SWa and SWb, capacitors Ca and Cb, and differential amplifiers AMPa and AMPb, and an ADC circuit, which is composed of switches SWc, SWd, and SWe, a capacitor Cc, a differential amplifier AMPc, a ramp signal generating circuit RSGa, a counter CNTa, and a latch circuit LCa.

A non-inverting input terminal of the differential amplifier AMPa is connected to one end of the switch SWa whose other end is connected to the signal output line SOL. The non-inverting input terminal of the differential amplifier AMPa is also connected to one end of the capacitor Cb whose other end is connected to the ground line. An inverting input terminal of the differential amplifier AMPa is connected to an output terminal of the differential amplifier AMPa. A non-inverting input terminal of the differential amplifier AMPb is connected to one end of the capacitor Cb whose other end is connected to the output terminal of the differential amplifier AMPa. The non-inverting input terminal of the differential amplifier AMPb is also connected to one end of the switch SWb whose other end is connected to a power line Vref. The inverting input terminal of the differential amplifier AMPb is connected to an output terminal of the differential amplifier AMPb.

A non-inverting input terminal of the differential amplifier AMPc is connected to one end of the switch SWc whose other end is connected to the output terminal of the differential amplifier AMPb. The non-inverting input terminal of the differential amplifier AMPc is also connected to one end of the switch SWd whose other end receives the ramp signal RMP. An inverting input terminal of the differential amplifier AMPc is connected to one end of the switch SWe whose other end is connected to an output terminal of the differential amplifier AMPc. The inverting input terminal of the differential amplifier AMPc is also connected to one end of the capacitor Cc whose other end is connected to the ground line.

The ramp signal generating circuit RSGa drops a voltage of the ramp signal RMP with a predetermined gradient when an A/D conversion in the data read operation is initiated. The counter CNTa initiates an up-count operation and outputs a counter value CV to the latch circuit LCa when the A/D conversion is initiated. The latch circuit LCa latches the counter value CV in response to a falling edge of an output signal of the differential amplifier AMPc and outputs the latched counter value CV as a digital value Do of a result of the A/D conversion.

Figure 4:
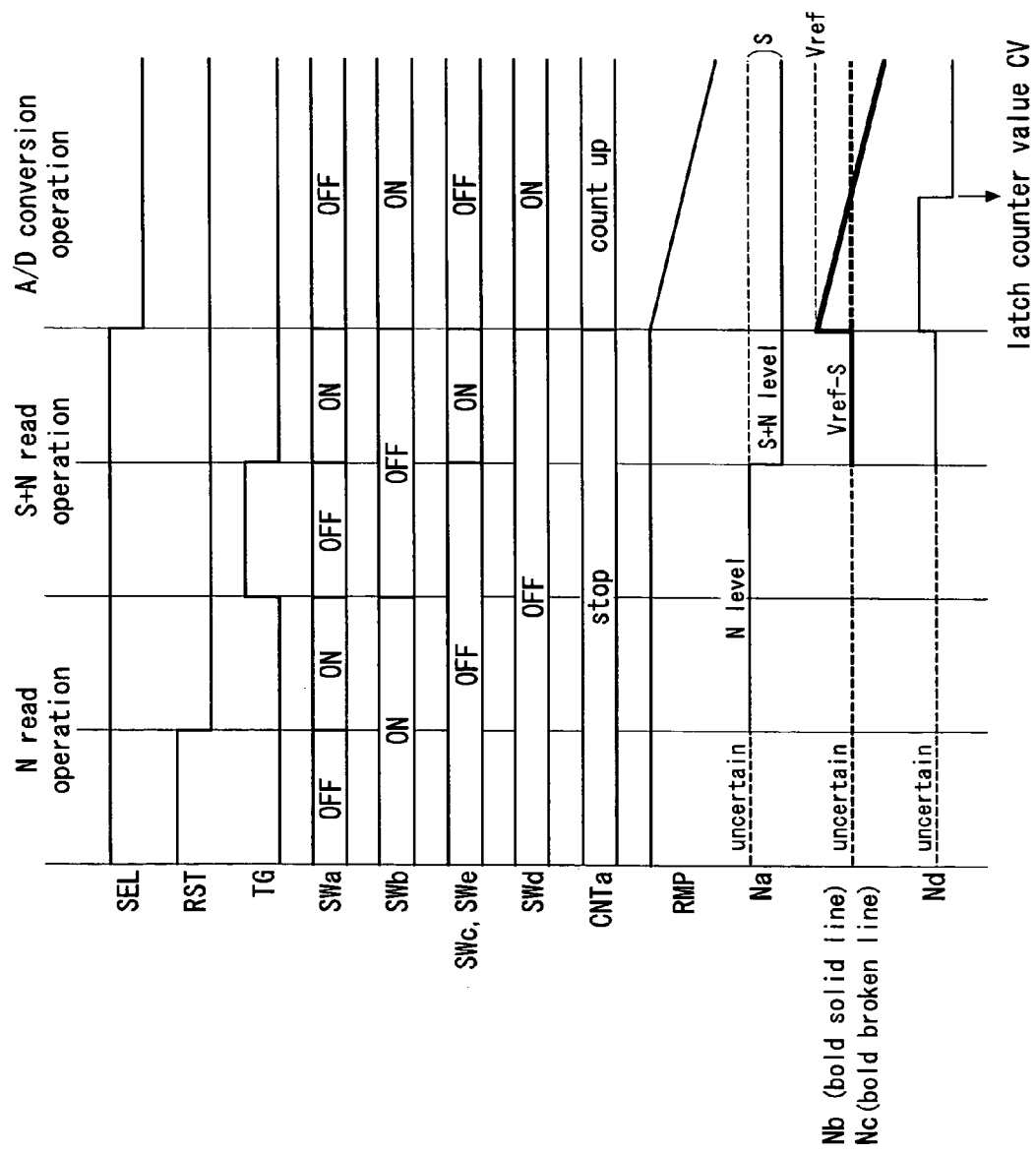
FIG. 4 is a timing chart illustrating a data read operation in the comparative example of the present invention.

FIG. 4 shows the data read operation in the comparative example of the present invention. Like the first embodiment, the data read operation in the comparative example of the present invention includes the N read operation, the S+N read operation, and the A/D conversion operation, which are sequentially performed.

First, in the N read operation, the transistor Q4 is turned on when the select signal SEL for selecting the pixel circuit PC1 as an object of the data read operation is activated. Simultaneously, the transistor Q1 is turned on when the reset signal RST is activated. Since the transistor Q3 is turned on depending on a voltage (corresponding to a reset voltage) of a connection node between the transistors Q1 and Q2, the signal output line SOL is set to a voltage (N level) of the noise signal. In addition, the switch SWb is turned on when the reset signal RST is activated. In addition, when the switch SWa is turned on after the reset signal RST is deactivated, a voltage of an output node Na of the differential amplifier AMPa is set to the N level. In addition, the transistor Q1 is turned off when the reset signal RST is deactivated.

Next, in the S+N read operation, after both of the switches SWa and SWb are turned off, the transistor Q2 is turned on when the trigger signal TRG is activated. Since the transistor Q3 is turned on depending on a voltage (corresponding to the amount of exposure of the photodiode PD) of the connection node between the transistors Q1 and Q2, the signal output line SOL is set to a voltage (S+N level) of the temporary data signal. In addition, when the switch SWa is turned on after the trigger signal TRG is deactivated, the voltage of the output node Na of the differential amplifier AMPa is set to the S+N level. Simultaneously, when both switches SWc and SWe are turned on, input nodes Nb and Nc of the differential amplifier AMPc are respectively set to a voltage (Vref-S) obtained by subtracting a potential difference S between the N level and the S+N level from a voltage Vref.

Subsequently, in the A/D conversion operation, after the switches SWa, SWc and SWe are turned off and the switches SWb and SWd are turned on, the ramp signal generating circuit RSGa begins to drop the voltage of the ramp signal RMP with the predetermined gradient. As the voltage drops, the voltage of the input node Nb of the differential amplifier AMPc also begins to drop from the voltage Vref with a predetermined gradient. Simultaneously, the counter CNTa initiates a count-up operation. In addition, when the voltage of the input node Nb of the differential amplifier AMPc is lower than the voltage (Vref-S) of the input node Nc, the output signal of the differential amplifier AMPc is changed from a high level to a low level. The latch circuit LCa latches the counter value CV in response to a falling edge of the output signal of the differential amplifier AMPc and outputs the latched counter value CV as a digital value Do of a result of the A/D conversion.

In the data read circuit DRCa as configured above, since the CDS circuit and the ADC circuit are separately provided, the number of amplifiers increases, which makes a circuit scale bigger. As a result, the production cost of the data read circuit DRCa is increased. Moreover, the increase in the number of amplifiers leads to a deterioration of data read accuracy as well as an increase of the current consumption of the data read circuit DRCa.

As can be seen from the above description, the first embodiment provides an integral form of the CDS circuit and the ADC circuit. This configuration can contribute to improvement of the data read accuracy as well as reduction of the scale (costs) and current consumption of the data read circuit DRC1 without lowering the data read speed. In addition, since the capacitive coupling of the capacitor C1 is used to raise the voltage of the input node N1 of the differential amplifier AMP, the voltage of the non-inverting input terminal of the differential amplifier AMP can be raised by a simple circuit configuration. In addition, since the voltage of the non-inverting input terminal of the differential amplifier AMP is raised from the S+N level and the voltage of the inverting input terminal remains at the N level and is unchanged, characteristics of the differential amplifier AMP can be improved, thereby contributing to the improvement of the data read accuracy.

Figure 5:
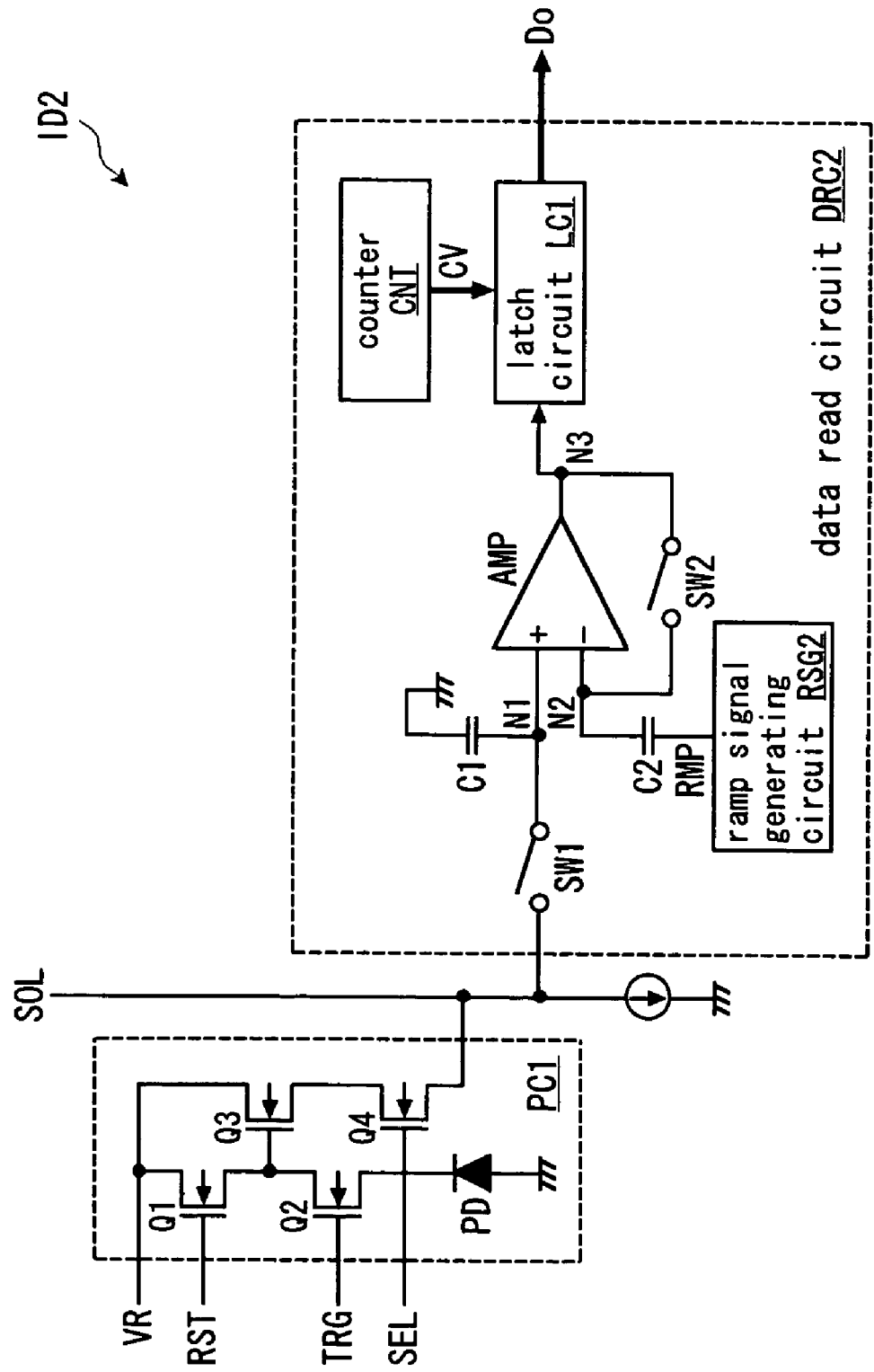
FIG. 5 is a block diagram of a second embodiment of the present invention.

FIG. 5 shows a second embodiment of the present invention. In the following description of the second embodiment, the same elements as those explained in connection with the first embodiment are denoted by the same reference numerals, and detailed explanation thereof will be omitted. Like the first embodiment, an imaging apparatus ID2 of the second embodiment includes, for example, a data read circuit DRC2 having a plurality of pixel circuits PC1 provided for each of signal output lines SOL (columns) of pixel arrays arranged in a matrix. Except that the capacitor C1 is connected to the ground line, the capacitor C2 receives the ramp signal RMP, and the ramp signal generating circuit RSG1 of the first embodiment (FIG. 1) is replaced by a ramp signal generating circuit RSG2, the data read circuit DRC2 has the same configuration as the data read circuit DRC1 of the first embodiment. The ramp signal generating circuit RSG2 drops a voltage of the ramp signal RMP with a predetermined gradient when an A/D conversion in the data read operation is initiated.

Figure 6:
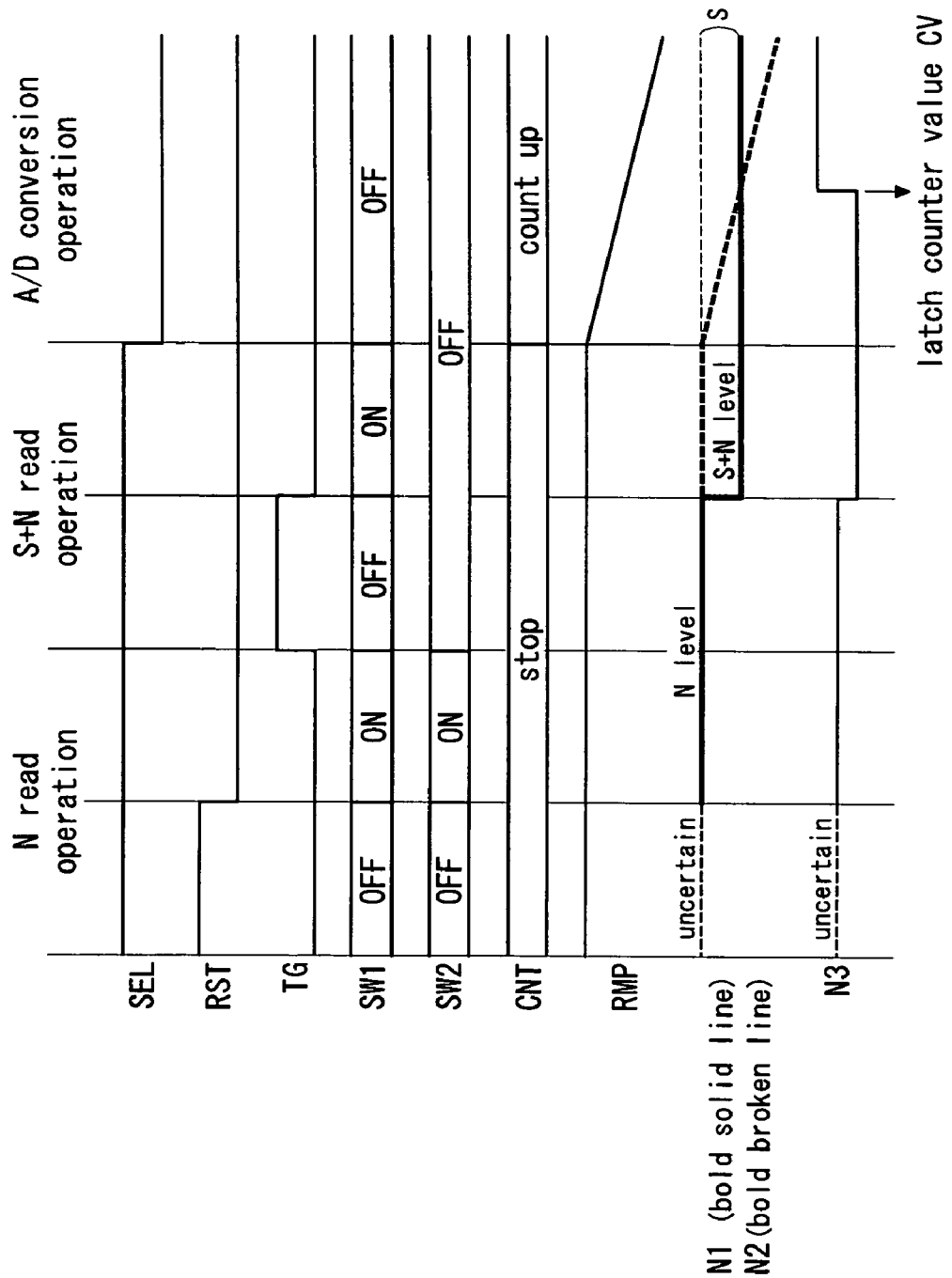
FIG. 6 is a timing chart illustrating a data read operation in the second embodiment.

FIG. 6 shows a data read operation in the second embodiment. First, like the first embodiment (FIG. 2), the N read operation and the S+N read operation are sequentially performed. Subsequently, in the A/D conversion operation, after the switch SW1 is turned off, the ramp signal generating circuit RSG2 begins to drop the voltage of the ramp signal RMP with the predetermined gradient. As the voltage drops, the voltage of the input node N2 of the differential amplifier AMP also begins to drop from the N level with a predetermined gradient by a capacitive coupling of the capacitor C2. Simultaneously, the counter CNT initiates a count-up operation.

In addition, when the voltage of the input node N2 of the differential amplifier AMP is lower than the voltage (S+N level) of the input node N1, the output signal of the differential amplifier AMP is changed from a low level to a high level. The latch circuit LC1 latches the counter value CV in response to a rising edge of the output signal of the differential amplifier AMP and outputs the latched counter value CV as a digital value Do of a result of the A/D conversion. The second embodiment as configure above can attain the same effect as the first embodiment.

Figure 7:
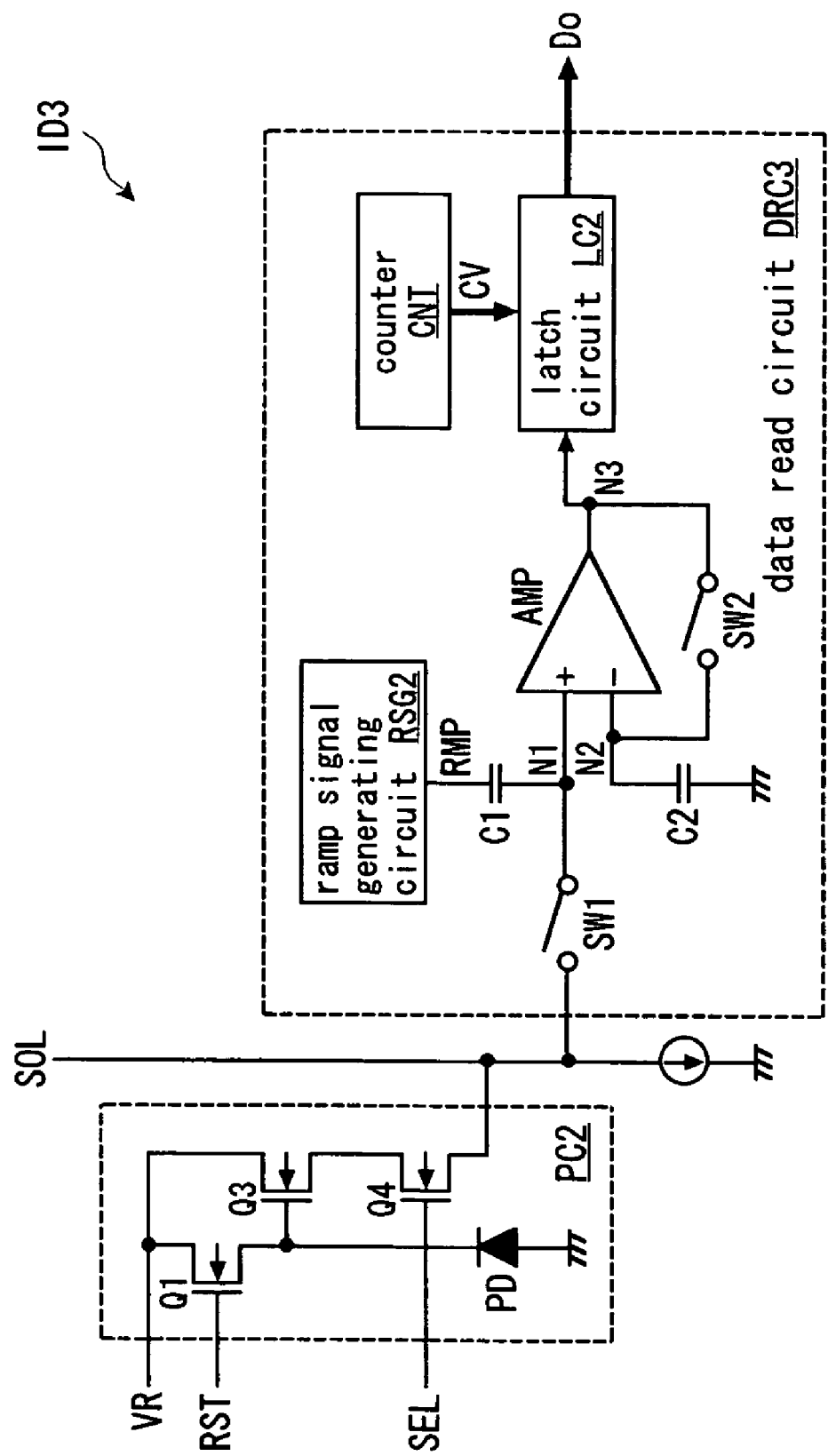
FIG. 7 is a block diagram of a third embodiment of the present invention.

FIG. 7 shows a third embodiment of the present invention. In the following description of the third embodiment, the same elements as those explained in connection with the first and second embodiments are denoted by the same reference numerals, and detailed explanation thereof will be omitted. Like the first embodiment, an imaging apparatus ID3 of the third embodiment includes, for example, a data read circuit DRC3 having a plurality of pixel circuits PC2 provided for each of signal output lines SOL (columns) of pixel arrays arranged in a matrix.

Each pixel circuit PC2, which is a well-known three-transistor pixel circuit, has a configuration where the transistor Q2 is removed from the pixel circuit PC1 of the first embodiment (FIG. 1). Such a three-transistor pixel circuit has an advantage in that the circuit scale can be reduced since the number of transistors is decreased, although the data read accuracy is deteriorated. Except that the ramp signal generating circuit RSG1 of the first embodiment (FIG. 1) is replaced by the ramp signal generating circuit RSG2 of the second embodiment (FIG. 5) and the latch circuit LC1 of the first embodiment is replaced by a latch circuit LC2, the data read circuit DRC3 has the same configuration as the data read circuit DRC1 of the first embodiment. The latch circuit LC2 latches the counter value CV in response to a falling edge of the output signal of the differential amplifier AMP and outputs the latched counter value CV as a digital value Do of a result of the A/D conversion.

Figure 8:
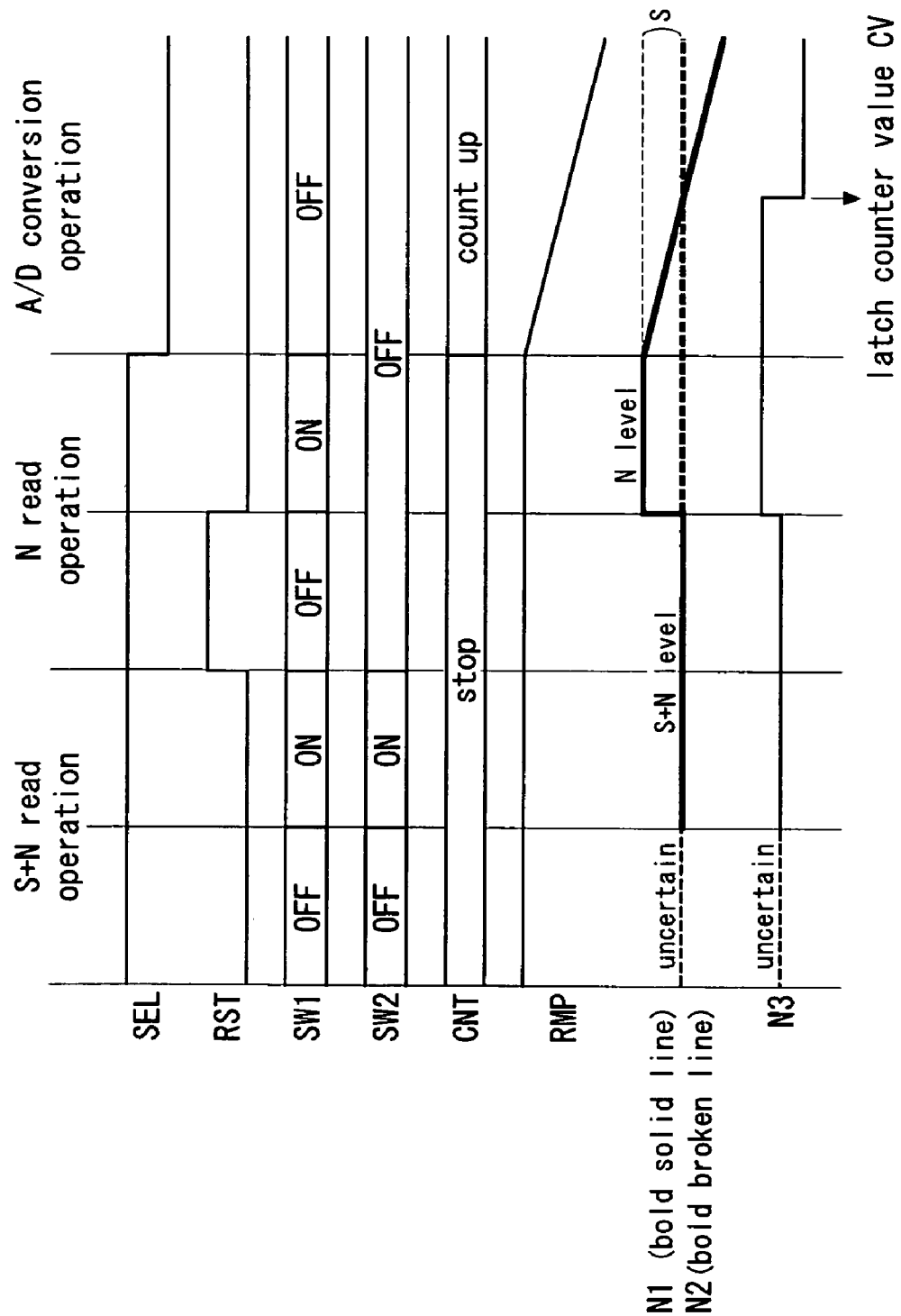
FIG. 8 is a timing chart illustrating a data read operation in the third embodiment.

FIG. 8 shows the data read operation in the third embodiment. The data read operation in the third embodiment includes a S+N read operation for reading a temporary data signal, which is a signal obtained by superposing a noise signal on a real data signal, from the pixel circuit PC2, an N read operation for reading the noise signal from the pixel circuit PC2, and the A/D conversion operation, which are sequentially performed.

First, in the S+N read operation, the transistor Q4 is turned on when the select signal SEL for selecting the pixel circuit PC2 as an object of the data read operation is activated. At this time, since the transistor Q3 is turned on depending on a voltage (corresponding to the amount of exposure of the photodiode PD) of a connection node between the transistor Q1 and the photodiode PD, the signal output line SOL is set to a voltage (S+N level) of the temporary data signal. In addition, when both of the switches SW1 and SW2 are turned on, both voltages of input nodes N1 and N2 of the differential amplifier AMP are set to the S+N level.

Next, in the N read operation, after both of the switches SW1 and SW2 are turned off, the transistor Q1 is turned on when the reset signal RST is activated. Accordingly, the signal output line SOL is set to a voltage (N level) of the noise signal. In addition, when the switch SW1 is turned on after the reset signal RST is deactivated, a voltage of the input node N1 of the differential amplifier AMP is set to the N level. Accordingly, an output signal of the differential amplifier AMP is set to a high level indicating that the voltage of the input node N1 is higher than the voltage of the input node N2. In addition, the transistor Q1 is turned off when the reset signal RST is deactivated.

Subsequently, in the A/D conversion operation, after the switch SW1 is turned off, the ramp signal generating circuit RSG2 begins to drop the voltage of the ramp signal RMP with the predetermined gradient. As the voltage drops, the voltage of the input node N1 of the differential amplifier AMP also begins to drop from the N level with a predetermined gradient by the capacitive coupling of the capacitor C1. Simultaneously, the counter CNT initiates a count-up operation. In addition, when the voltage of the input node N1 of the differential amplifier AMP is lower than the voltage (S+N level) of the input node N2, the output signal of the differential amplifier AMP is changed from a high level to a low level. The latch circuit LC2 latches the counter value CV in response to a falling edge of the output signal of the differential amplifier AMP and outputs the latched counter value CV as a digital value Do of a result of the A/D conversion. In the third embodiment as configured above, even when an object of the data read operation is the three-transistor pixel circuit, it can attain the same effect as the first embodiment.

Figure 9:
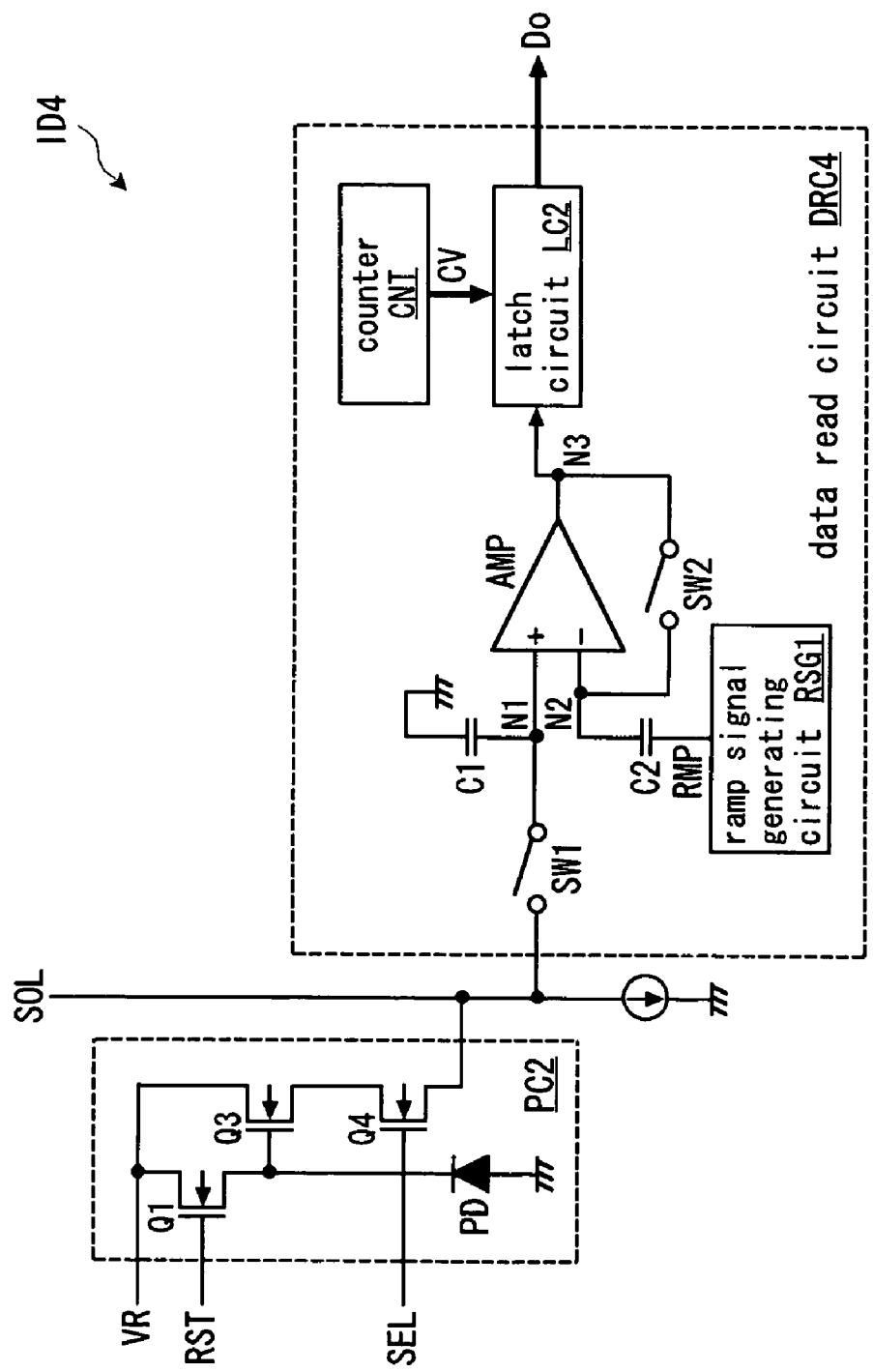
FIG. 9 is a block diagram of a fourth embodiment of the present invention.

FIG. 9 shows a fourth embodiment of the present invention. In the following description of the fourth embodiment, the same elements as those explained in connection with the first to third embodiments are denoted by the same reference numerals, and detailed explanation thereof will be omitted. Like the third embodiment, an imaging apparatus ID4 of the fourth embodiment includes, for example, a data read circuit DRC4 having a plurality of pixel circuits PC2 provided for each of signal output lines SOL (columns) of pixel arrays arranged in a matrix. Except that the ramp signal generating circuit RSG2 of the second embodiment (FIG. 5) is replaced by the ramp signal generating circuit RSG1 of the first embodiment (FIG. 1) and the latch circuit LC1 of the first embodiment is replaced by the latch circuit LC2 of the third embodiment (FIG. 7), the data read circuit DRC4 has the same configuration as the data read circuit DRC2 of the second embodiment.

Figure 10:
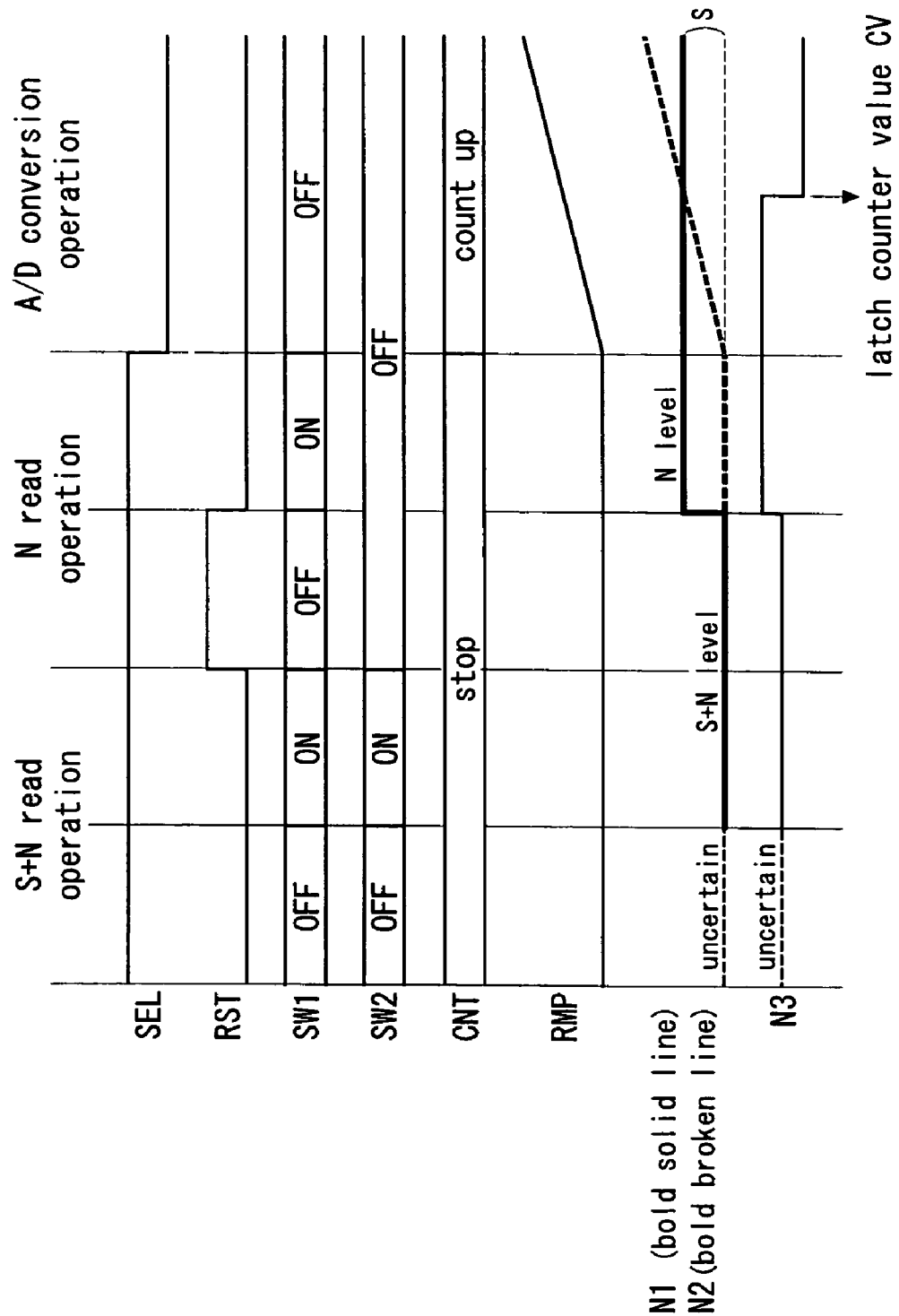
FIG. 10 is a timing chart illustrating a data read operation in the fourth embodiment.

FIG. 10 shows a data read operation in the fourth embodiment. In the data read operation of the fourth embodiment, first, like the third embodiment (FIG. 8), the S+N read operation and the N read operation are sequentially performed. Subsequently, in the A/D conversion operation, after the switch SW1 is turned off, the ramp signal generating circuit RSG1 begins to raise the voltage of the ramp signal RMP with the predetermined gradient. As the voltage is raised, the voltage of the input node N2 of the differential amplifier AMP also begins to rise from the S+N level with the predetermined gradient by the capacitive coupling of the capacitor C2. Simultaneously, the counter CNT initiates a count-up operation. In addition, when the voltage of the input node N2 of the differential amplifier AMP exceeds the voltage (N level) of the input node N1, the output signal of the differential amplifier AMP is changed from a high level to a low level. The latch circuit LC2 latches the counter value CV in response to a falling edge of the output signal of the differential amplifier AMP and outputs the latched counter value CV as a digital value Do of a result of the A/D conversion. The fourth embodiment as configure above can also attain the same effect as the first to third embodiments.

Although the data read circuits employing a one-stage differential amplifier have been illustrated in the first to fourth embodiments, the present invention is not limited to these embodiments. For example, multi-stage differential amplifiers may be employed for the data read circuit depending on a required gain. In addition, although it has been illustrated that the switch SW1 is once turned off in the S+N read operation in the first and second embodiments (the N read operation in the case of the third and fourth embodiments), the present invention is not limited to this operation. For example, the switch SW1 may remain turned on in the S+N read operation (and the N read operation) if an influence of the data read circuit on the pixel circuit is negligible.

In addition, although it has been illustrated that the read voltage of the temporary data signal is lower than the read voltage of the noise signal in the first to fourth embodiments, the present invention is not limited thereto. For example, when a photodiode PD having an opposite characteristic is employed, needless to say that the read voltage of the temporary data signal goes higher than that of the noise signal so that the ramp signal RMP applied to the data read circuit has to be given an opposite characteristic with regard to a direction of the voltage variation (increase or decrease).

The invention is not limited to the above embodiments and various modifications may be made without departing from the spirit and scope of the invention. Any improvement may be made in part or all of the components.

What is claimed is:

1. A data read circuit of a solid-state imaging device, comprising:

a differential amplifier having a first input terminal to which a voltage of a noise signal of the solid-state imaging device is supplied and a second input terminal to which a voltage of a temporary data signal is supplied, and inverting an output signal in response to occurrence of an event that a magnitude relationship in voltage between the first and second input terminals becomes reverse, the temporary data signal being a signal having the noise signal superposed thereon;

a switch which forms a connection between an output terminal of the differential amplifier and at least one of the first input terminal or the second input terminal, and operates in response to a supply of the voltage of the noise signal to the first input terminal and a supply of the voltage of the temporary data signal to the second input terminal; and a measurement circuit which measures an amount of variation in a voltage of one of the first and second input terminals from when the voltage of one of the input terminals begins to vary in a direction to reverse the magnitude relationship in voltage to when the output signal is inverted, and which outputs a result of the measurement as a digital value indicating a voltage of a real data signal obtained by removing the noise signal from the temporary data signal.

2. The data read circuit of the solid-state imaging device according to claim 1, further comprising:

a ramp signal generating circuit generating a ramp signal of which a voltage is increased with a predetermined gradient when the voltage of the temporary data signal is lower than the voltage of the noise signal; and a capacitor element having one end connected to the second input terminal and the other end receiving the ramp signal, wherein the one of the first and second input terminals is the second input terminal.

3. The data read circuit of the solid-state imaging device according to claim 2, wherein the measurement circuit includes:

a counter initiating a count operation when the voltage of the ramp signal begins to vary; and a measurement result output circuit acquiring a counter value of the counter in response to an inversion of the output signal, to output an acquired counter value as the digital value.

4. The data read circuit of the solid-state imaging device according to claim 1, wherein:

the one of the first and second input terminals is the second input terminal; and the first and second input terminals are an inverting input terminal and a non-inverting input terminal, respectively.

5. The data read circuit of the solid-state imaging device according to claim 1, wherein the switch is connected between the output terminal and the first input terminal and is turned off when the voltage of the temporary data signal is supplied to the second input terminal after being turned on when the voltage of the noise signal is supplied to the first input terminal.

6. The data read circuit of the solid-state imaging device according to claim 1, wherein the switch is connected between the output terminal and the second input terminal and is turned off when the voltage of the noise signal is supplied to the first input terminal after being turned on when the voltage of the temporary data signal is supplied to the second input terminal.

7. An imaging apparatus comprising:

a solid-state imaging device outputting a noise signal and a temporary data signal which is a signal having the noise signal superposed thereon; and a data read circuit outputting a digital value indicating a voltage of a real data signal, according to a voltage of the noise signal and to a voltage of the temporary data signal, the real data signal being obtained by removing the noise signal from the temporary data signal, wherein the data read circuit includes:

a differential amplifier having a first input terminal to which the voltage of the noise signal is supplied and a second input terminal to which the voltage of the temporary data signal is supplied, and inverting an output signal in response to occurrence of an event that a magnitude relationship in voltage between the first and second input terminals becomes reverse;

a switch which forms a connection between an output terminal of the differential amplifier and at least one of the first input terminal or the second input terminal, and operates in response to a supply of the voltage of the noise signal to the first input terminal and a supply of the voltage of the temporary data signal to the second input terminal; and a measurement circuit which measures an amount of variation in a voltage of one of the first and second input terminals from when the voltage of one of the input terminals begins to vary in a direction to reverse the magnitude relationship in voltage to when the output signal is inverted, and which outputs a result of the measurement as a digital value indicating a voltage of a real data signal obtained by removing the noise signal from the temporary data signal.

8. The imaging apparatus according to claim 7, wherein:

the one of the first and second input terminals is the second input terminal;

the data read circuit comprises a ramp signal generating circuit generating a ramp signal of which a voltage is increased with a predetermined gradient when the voltage of the temporary data signal is lower than the voltage of the noise signal; and a capacitor element having one end connected to the second input terminal and the other end receiving the ramp signal.

9. The imaging apparatus according to claim 8, wherein the measurement circuit includes:

a counter initiating a count operation when the voltage of the ramp signal begins to vary; and a measurement result output circuit acquiring a counter value of the counter in response to an inversion of the output signal, to output an acquired counter value as the digital value.

10. The imaging apparatus according to claim 7, wherein:

the one of the first and second input terminals is the second input terminal; and the first and second input terminals are an inverting input terminal and a non-inverting input terminal, respectively.

11. The imaging apparatus according to claim 7, wherein the switch is connected between the output terminal and the first input terminal and is turned off when the voltage of the temporary data signal is supplied to the second input terminal after being turned on when the voltage of the noise signal is supplied to the first input terminal.

12. The imaging apparatus according to claim 7, wherein the switch is connected between the output terminal and the second input terminal and is turned off when the voltage of the noise signal is supplied to the first input terminal after being turned on when the voltage of the temporary data signal is supplied to the second input terminal.

13. A data read method for a solid-state imaging device, comprising the steps of:

supplying a voltage of a temporary data signal to a second input terminal of a differential amplifier after supplying a voltage of a noise signal of the solid-state imaging device to a first input terminal of the differential amplifier, the temporary data signal being a signal having the noise signal of the solid-state imaging device superposed thereon, the differential amplifier inverting an output signal in response to occurrence of an event that a magnitude relationship in voltage between the first and second input terminals becomes reverse;

turning on a switch connected between an output terminal of the differential amplifier and the first input terminal when supplying the voltage of the noise signal to the first input terminal, and turning off the switch when supplying the voltage of the temporary data signal to the second input terminal;

varying a voltage of one of the first and second input terminals in a direction to reverse the magnitude relationship in voltage; and measuring an amount of variation in the voltage of one of the first and second input terminals from when the voltage of one of the input terminals begins to vary to when the output signal is inverted, and outputting a result of the measurement as a digital value indicating a voltage of a real data signal obtained by removing the noise signal from the temporary data signal.

14. A data read method for a solid-state imaging device, comprising the steps of:

supplying a voltage of a noise signal of the solid-state imaging device to a first input terminal of a differential amplifier after supplying a voltage of a temporary data signal to a second input terminal of the differential amplifier, the temporary data signal being a signal having the noise signal of the solid-state imaging device superposed thereon, the differential amplifier inverting an output signal in response to occurrence of an event that a magnitude relationship in voltage between the first and second input terminals becomes reverse;

turning on a switch connected between an output terminal of the differential amplifier and the second input terminal when supplying the voltage of the temporary data signal to the second input terminal, and turning off the switch when supplying the voltage of the noise signal to the first input terminal;

varying a voltage of one of the first and second input terminals in a direction to reverse the magnitude relationship in voltage; and measuring an amount of variation in the voltage of one of the first and second input terminals from when the voltage of one of the input terminals begins to vary to when the output signal is inverted, and outputting a result of the measurement as a digital value indicating a voltage of a real data signal obtained by removing the noise signal from the temporary data signal.

* * * * *